United States Patent
Li

(10) Patent No.: US 12,035,328 B2
(45) Date of Patent: Jul. 9, 2024

(54) RESOURCE INDICATION METHOD, AND DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 420 days.

(21) Appl. No.: 17/602,752

(22) PCT Filed: Apr. 10, 2019

(86) PCT No.: PCT/CN2019/082130
§ 371 (c)(1),
(2) Date: Oct. 9, 2021

(87) PCT Pub. No.: WO2020/206640
PCT Pub. Date: Oct. 15, 2020

(65) Prior Publication Data
US 2022/0167325 A1    May 26, 2022

(51) Int. Cl.
H04W 72/04    (2023.01)
H04W 72/044    (2023.01)
H04W 72/23    (2023.01)

(52) U.S. Cl.
CPC ......... *H04W 72/23* (2023.01); *H04W 72/044* (2013.01)

(58) Field of Classification Search
CPC ............. H04W 72/0446; H04W 88/08; H04W 72/0453; H04W 24/00; H04W 72/23;
(Continued)

(56) References Cited

U.S. PATENT DOCUMENTS

| 6,560,209 B1 * | 5/2003 | Alamouti | .............. H04L 5/0007 370/336 |
| 11,632,219 B2 * | 4/2023 | Jiao | ....................... H04L 1/1861 370/330 |

(Continued)

FOREIGN PATENT DOCUMENTS

| WO | WO 2018/022887 A1 * | 2/2018 | ............... F01N 3/20 |
| WO | WO 2018/028394 A1 * | 2/2018 | ............... H04L 1/00 |

(Continued)

OTHER PUBLICATIONS

3GPP TSG RAN WG1 Meeting #94bis, Chengdu, China, Oct. 8-12, 2018, R1-1810283, Agenda item: 7.2.4.1.4, Source: LG Electronics, Title: Discussion on sidelink resource allocation mechanism. (Year: 2018).*

(Continued)

*Primary Examiner* — Peter G Solinsky
*Assistant Examiner* — Sanjay K Dewan
(74) *Attorney, Agent, or Firm* — Cozen O'Connor

(57) ABSTRACT

A resource indication method in a communication system includes: determining a first time-frequency resource of a first antenna panel configured to send downlink data to a first terminal; determining a second time-frequency resource of a second antenna panel configured to send downlink data to a second terminal; generating preemption indication information indicating the second time-frequency resource in response to determining that the first antenna panel is the same as the second antenna panel and the first time-frequency resource overlaps with the second time-frequency resource; and sending the preemption indication information to the first terminal, such that the first terminal determines, based on the preemption indication information, an overlapped resource between the first time-frequency resource (Continued)

and the second time-frequency resource, and determines not to receive the downlink data on the overlapped resource.

19 Claims, 10 Drawing Sheets

(58) Field of Classification Search
CPC .. H04W 72/044; H04W 72/042; H04L 5/0007
USPC ............................................................ 370/330
See application file for complete search history.

(56) References Cited

U.S. PATENT DOCUMENTS

| | | | | |
|---|---|---|---|---|
| 11,728,868 | B2* | 8/2023 | Wang | H04B 7/066 370/330 |
| 2010/0195615 | A1* | 8/2010 | Lee | H04L 25/03343 370/330 |
| 2010/0322184 | A1* | 12/2010 | Xiao | G01S 5/0036 370/330 |
| 2014/0341180 | A1* | 11/2014 | Liu | H04L 5/0048 370/330 |
| 2015/0289141 | A1* | 10/2015 | Ghasemzadeh | H04W 72/0446 370/330 |
| 2019/0149380 | A1* | 5/2019 | Babaei | H04W 72/0446 370/330 |
| 2019/0254058 | A1* | 8/2019 | Xie | H04L 1/00 |
| 2020/0267536 | A1* | 8/2020 | Zhou | H04B 7/0404 |
| 2023/0118078 | A1* | 4/2023 | Abedini | H04L 45/20 370/330 |
| 2023/0140729 | A1* | 5/2023 | He | H04W 56/0015 370/329 |
| 2023/0144547 | A1* | 5/2023 | Bhamri | H04L 5/0023 370/330 |
| 2023/0262675 | A1* | 8/2023 | Falkenberg | H04W 72/046 370/329 |
| 2023/0276496 | A1* | 8/2023 | Agardh | H04L 5/0053 370/330 |

FOREIGN PATENT DOCUMENTS

| | | | | |
|---|---|---|---|---|
| WO | WO 2018028394 | A1 | 2/2018 | |
| WO | WO 2018/144660 | A1 * | 8/2018 | ............... H04L 1/00 |
| WO | WO 2018144660 | A1 | 8/2018 | |
| WO | WO 2018/228487 | A1 * | 12/2018 | ............ H04W 72/04 |

OTHER PUBLICATIONS

European Patent Application No. 19924543.2, Search and Opinion dated Oct. 17, 2022, 9 pages.

* cited by examiner

RESOURCE INDICATION METHOD, AND DEVICE

CROSS-REFERENCE TO RELATED APPLICATION

The present application is a national stage of International Application No. PCT/CN2019/082130, filed on Apr. 10, 2019, the content of which is hereby incorporated by reference in its entirety.

TECHNICAL FIELD

The disclosure relates to the field of communication technology, in particular to managing communication resources using a resource indication method and a resource indication apparatus.

BACKGROUND

Supporting a flexible configuration of multiple business types with different performance requirements is a high priority in new-generation communication systems. For example, the requirements of the business type of enhanced Mobile Broadband (eMBB) mainly focus on a large bandwidth, a high speed and the like; and the requirements of the business type of Ultra Reliable Low Latency Communication (URLLC) mainly focus on a high reliability and a low latency.

SUMMARY

In order to overcome the problems existing in the related art, the embodiments of the disclosure provide a resource indication method and a resource indication apparatus.

According to embodiments of the disclosure in a first aspect, a resource indication method is provided. The method is applied to a base station. The method includes: determining a first time-frequency resource of a first antenna panel configured to send downlink data to a first terminal; determining a second time-frequency resource of a second antenna panel configured to send downlink data to a second terminal; generating preemption indication information indicating the second time-frequency resource in response to determining that the first antenna panel is the same as the second antenna panel and the first time-frequency resource overlaps with the second time-frequency resource; and sending the preemption indication information to the first terminal, such that the first terminal determines, based on the preemption indication information, an overlapped resource between the first time-frequency resource and the second time-frequency resource, and determines not to receive the downlink data on the overlapped resource.

According to embodiments of the disclosure in a second aspect, a resource indication method is provided. The method is applied to a first terminal. The method includes: receiving preemption indication information sent by a base station, in which the preemption indication information is configured to indicate a second time-frequency resource and is generated by the base station in response to determining that a first antenna panel is the same as a second antenna panel and a first time-frequency resource overlaps with the second time-frequency resource; the first antenna panel and the first time-frequency resource are configured to send downlink data to the first terminal by the base station, and the second antenna panel and the second time-frequency resource are configured to send downlink data to a second terminal by the base station; and determining, based on the preemption indication information, an overlapped resource between the first time-frequency resource and the second time-frequency resource and determining not to receive the downlink data on the overlapped resource.

According to embodiments of the disclosure in a third aspect, a resource indication apparatus is provided. The apparatus is applied to a base station. The apparatus includes: a processor and a memory for storing instructions executable by the processor. The processor is configured to: determine a first time-frequency resource of a first antenna panel configured to send downlink data to a first terminal; determine a second time-frequency resource of a second antenna panel configured to send the downlink data to a second terminal; generate preemption indication information indicating the second time-frequency resource in response to determining that the first antenna panel is the same as the second antenna panel and the first time-frequency resource overlaps with the second time-frequency resource; and send the preemption indication information to the first terminal, such that the first terminal determines, based on the preemption indication information, an overlapped resource between the first time-frequency resource and the second time-frequency resource and determines not to receive the downlink data on the overlapped resource.

According to embodiments of the disclosure in a fourth aspect, a resource indication apparatus is provided. The apparatus is applied to a terminal. The apparatus includes: a processor and a memory for storing instructions executable by the processor. The processor is configured to: receive preemption indication information indicating a second time-frequency resource sent by a base station, the preemption indication information is generated by the base station in response to determining that a first antenna panel is the same as a second antenna panel and a first time-frequency resource overlaps with the second time-frequency resource; the first antenna panel and the first time-frequency resource are configured to send downlink data to the first terminal by the base station, and the second antenna panel and the second time-frequency resource are configured to send the downlink data to a second terminal by the base station; and determine, based on the preemption indication information, an overlapped resource between the first time-frequency resource and the second time-frequency resource and determine not to receive the downlink data on the overlapped resource.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate the embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish information of the same type from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

In the related art, in order to meet business requirements of different business types, a pre-emption indication is introduced. For example, a base station allocates a frequency domain resource RB set #0 of time slot t1 to the eMBB business of UE #1, and after the allocation is completed, a bursty URLLC business of UE #2 arises. The base station then allocates the RB set #0 of two symbols in the time slot t1 to the URLLC business of UE #2. In order to achieve better reception of UE #1 for the eMBB business, the base station also needs to inform UE #1 that the RB set #0 of two symbols in the time slot t1 is not actually used for sending to the eMBB business of UE #1. Therefore, when received by UE #1, the data transmitted on such time-frequency resource does not need to be considered by UE #1, as indicated by the pre-emption indication.

However, in the new-generation communication system, due to the fast attenuation of high-frequency channels, a beam-based transmission and reception is used to ensure the coverage, and the pre-emption indication in the related art only includes an indication of time-frequency resources, which reduces the accuracy of resource indication.

Figure 1:
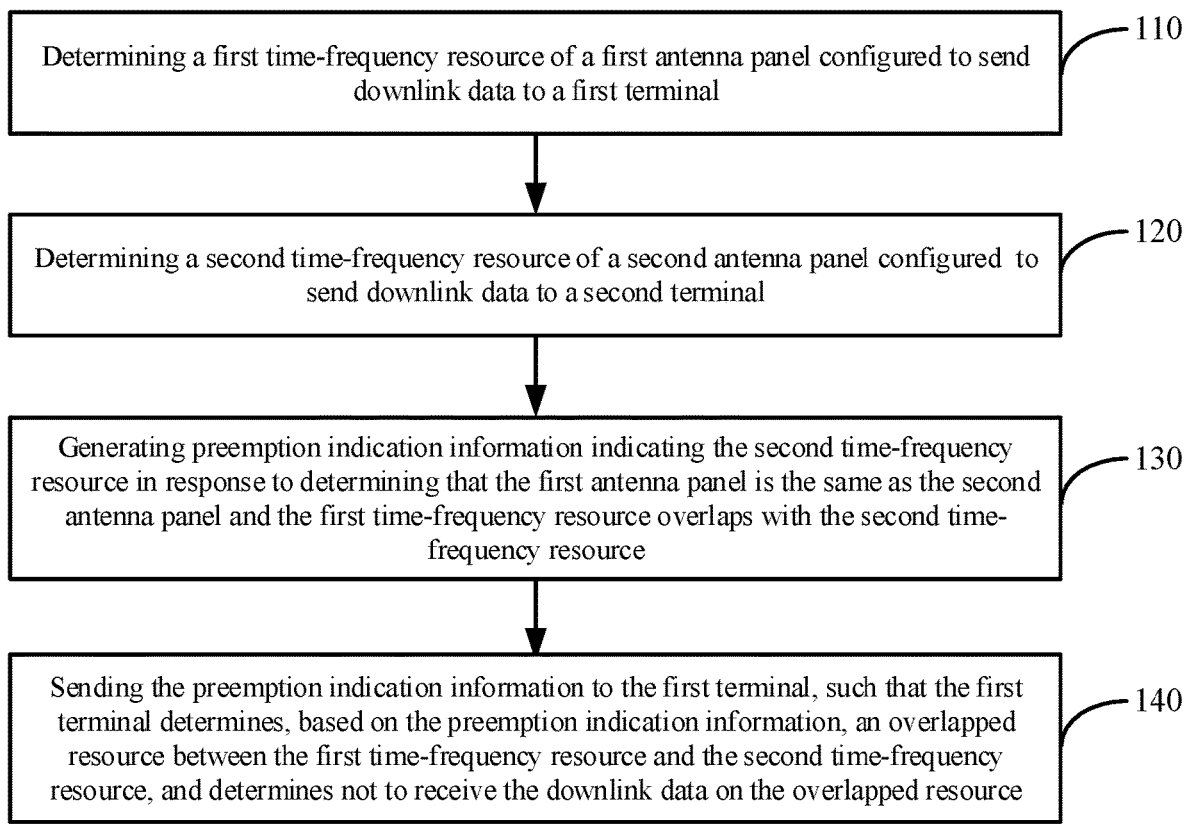
FIG. 1 is a flowchart of a resource indication method according to an exemplary embodiment.
Figure 2:
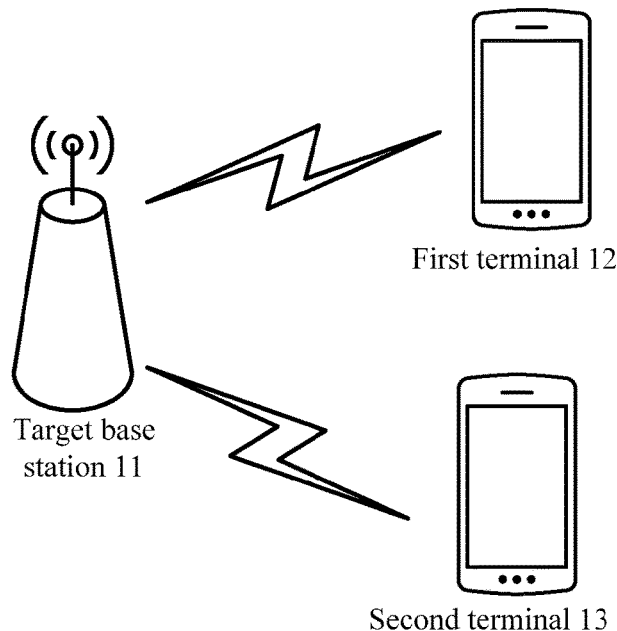
FIG. 2 is a schematic diagram of an application scenario of a resource indication method according to an exemplary embodiment.

FIG. 1 is a flowchart of a resource indication method according to an exemplary embodiment. FIG. 2 is a schematic diagram of an application scenario of a resource indication method according to an exemplary embodiment. As illustrated in FIG. 1, the resource indication method may include the following steps 110-140.

In 110, a first time-frequency resource of a first antenna panel configured to send downlink data to a first terminal is determined.

In the embodiment of the disclosure, the first antenna panel and the first time-frequency resource are the antenna panel and the time-frequency resource used by the base station when it sends the downlink data to the first terminal.

In an embodiment, if the first antenna panel belongs to a first Transmission Reception Point (TRP) and the first TRP has only one antenna panel, 110 may also include: determining the first time-frequency resource of the first TRP configured to send the downlink data to the first terminal.

In 120, a second time-frequency resource of a second antenna panel configured to send downlink data to a second terminal is determined.

In the embodiment of the disclosure, the second antenna panel and the second time-frequency resource are the antenna panel and the time-frequency resource used by the base station when it sends the downlink data to the second terminal.

In an embodiment, if the second antenna panel belongs to a second TRP and the second TRP has only one antenna panel, 120 may also include: determining the second time-frequency of resource the second TRP configured to send the downlink data to the second terminal.

In 130, preemption indication information indicating the second time-frequency resource is generated in response to determining that the first antenna panel is the same as the second antenna panel and the first time-frequency resource overlaps with the second time-frequency resource.

In the embodiment of the disclosure, since the same antenna panel can only have one beam direction at the same time, and different antenna panels can have different beam directions at the same time, even when the first time-frequency resource overlaps with the second time-frequency resource, if the first antenna panel is different from the second antenna panel, the base station does not need to generate the preemption indication information in this case. That is, only when the first antenna panel is the same as the second antenna panel, and the first time-frequency resource overlaps with the second time-frequency resource, does the base station needs to generate the preemption indication information.

In addition, the above term "overlap" in 130 may refer to that the first time-frequency resource partially or completely overlaps with the second time-frequency resource.

In an embodiment, the preemption indication information in 130 may include the second time-frequency resource and the second antenna panel. For the specific implementation process, reference can be made to the embodiment shown in FIG. 4.

In an embodiment, the preemption indication information in 130 may include the second time-frequency resource. For the specific implementation process, reference can be made to the embodiment shown in FIG. 5.

In addition, in an embodiment, if the first time-frequency resource of the first TRP configured to send the downlink data to the first terminal is determined and the first TRP has only one antenna panel, the second time-frequency resource of the second TRP configured to send the downlink data to the second terminal is determined and the second TRP has only one antenna panel, 130 may also include: generating the preemption indication information indicating the second time-frequency resource in response to determining that the first TRP is the same as the second TRP and the first time-frequency resource overlaps with the second time-frequency resource. That is, the base station may include one or more TRPs, and each TRP may include one or more antenna panels. Only when the first antenna panel and the second antenna panel belong to the same antenna panel of the same TRP, the first antenna panel is the same as the second antenna panel.

In 140, the preemption indication information is sent to the first terminal, such that the first terminal determines, based on the preemption indication information, an overlapped resource between the first time-frequency resource and the second time-frequency resource, and determines not to receive the downlink data on the overlapped resource.

In the embodiment of the disclosure, the first terminal may represent a terminal whose resources are occupied, and the second terminal may represent a terminal that needs to occupy resources.

For example, the business that the base station needs to send to the first terminal is eMBB business, and the business that the base station needs to send to the second terminal is URLLC business. Since the URLLC business has a high latency requirement, the second terminal needs to occupy part or all of the resources which would have been allocated to the first terminal, and when the first terminal receives downlink data, it does not need to receive the downlink data sent on the resources occupied by the second terminal.

In an exemplary scenario, FIG. 2 illustrates a base station 11, a first terminal 12 and a second terminal 13. The base station 11 determines the first time-frequency resource of the first antenna panel configured to send the downlink data to the first terminal 12, and the second time-frequency resource of the second antenna panel configured to send the downlink data to the second terminal 13. The preemption indication information indicating the second time-frequency resource is generated in response to determining that the first antenna panel is the same as the second antenna panel and the first time-frequency resource overlaps with the second time-frequency resource. The preemption indication information is sent to the first terminal 12, such that the first terminal 12 determines, based on the preemption indication information, an overlapped resource between the first time-frequency resource and the second time-frequency resource, and determines not to receive the downlink data on the overlapped resource.

In the disclosure, the base station 11 may be a device deployed in an access network for providing wireless communication functions for the first terminal 12 and the second terminal 13. The base station 11 may include various forms of macro base stations, micro base stations, relay stations, access points and the like. In systems using different wireless access technologies, the names of devices having the function of a base station may vary. For example, in the 5G NR system, the devices are called gNodeB or gNB. As communication technologies evolve, the name "base station" may change. For the convenience of description, in the embodiments of the disclosure, the devices for providing wireless communication functions for the terminal 12 are collectively referred to as the base station.

Generally, there are a plurality of the first terminals 12 and the second terminals 13, and one or more of the first terminal 12 and the second terminal 13 may be distributed in a cell managed by each base station 11. The first terminal 12 and the second terminal 13 may include various handheld devices, vehicle-mounted devices, wearable devices, computing devices with wireless communication functions or other processing devices connected to a wireless modem, and various forms of User Equipment (UEs), Mobile Stations (MSs), terminal devices and the like. For ease of description, in the embodiments of the disclosure, the above devices are collectively referred to as the terminal.

It can be seen from the above embodiments, after determining the first time-frequency resource of the first antenna panel configured to send the downlink data to the first terminal, and the second time-frequency resource of the second antenna panel configured to send the downlink data to the second terminal, the preemption indication information indicating the second time-frequency resource is generated merely in response to determining that the first antenna panel is the same as the second antenna panel and the first time-frequency resource overlaps with the second time-frequency resource. The preemption indication information is sent to the first terminal, such that the first terminal can determine, based on the preemption indication information, the overlapped resource between the first time-frequency resource and the second time-frequency resource, and determines not to receive the downlink data on the overlapped resource. Therefore, resource usage diversity between terminals of different business types is ensured, and the accuracy of resource indication is improved.

Figure 3:
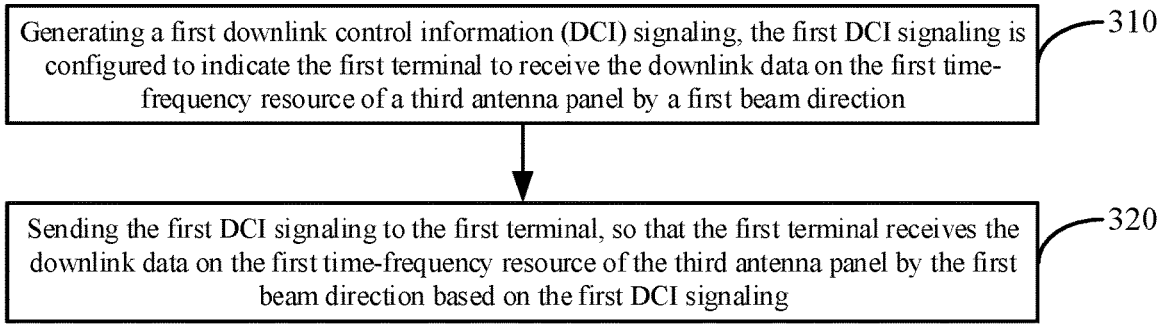
FIG. 3 is a flowchart of another resource indication method according to an exemplary embodiment.

FIG. 3 is a flowchart of another resource indication method according to an exemplary embodiment. The resource indication method may be applied in a base station and based on the method shown in FIG. 1. As illustrated in FIG. 3, the resource indication method may further include the following steps 310-320 (for example, after 110 is executed, the following steps 310-320 may also be included).

In 310, a first downlink control information (DCI) signaling is generated, the first DCI signaling is configured to indicate the first terminal to receive the downlink data on the first time-frequency resource of a third antenna panel by a first beam direction.

In the embodiment of the disclosure, the base station may indicate through the first DCI signaling the first terminal to receive the downlink data on the first time-frequency resource of the third antenna panel by the first beam direction. The first beam direction of the third antenna panel is directed to the first terminal side.

In addition, in 310, both the time-frequency resource and the antenna panel as well as the receiving beam configured to receive data by the terminal need to be indicated due to the fast high-frequency channel attenuation. It is required to use the beam-based transmission and reception to ensure coverage. Therefore, the disclosure not only needs to indicate the time-frequency resource for resource indication, but also needs to indicate the antenna panel and the receiving beam configured to receive data by the terminal.

In 320, the first DCI signaling is sent to the first terminal, so that the first terminal receives the downlink data on the first time-frequency resource of the third antenna panel by the first beam direction based on the first DCI signaling.

In an embodiment, the first DCI signaling in 310 as described above may include the first time-frequency resource and first Transmission Configuration Indication (TCI) domain indication information configured to indicate the third antenna panel.

The first TCI domain indication information includes a reference signal identifier corresponding to the third antenna panel, and/or a panel identifier of the third antenna panel. That is, the first TCI domain indication information needs to indicate both the receiving antenna panel used by the terminal and the receiving beam used on the panel.

In the embodiment of the disclosure, the third antenna panel can be indicated by the first TCI domain, and the first TCI domain can indicate one or more TCI states, and each TCI state corresponds to a reference signal identifier. The reference signal identifier may be a Synchronization Signal Block (SSB) identifier, or a Non Zero Power Channel State Information Reference Signal (NZP CSI-RS) identifier or a sounding reference signal (SRS) identifier, each TCI state corresponds to a beam direction, that is, the beam direction is the receiving beam direction used when the terminal receives the reference signal corresponding to the TCI state. Meanwhile, each TCI state can also include an identifier of the antenna panel.

In addition, if the reference signal identifiers used by different antenna panels are different, the reference signal identifiers may be used to distinguish the antenna panels, and the identifiers of the antenna panels are not needed. That is, the first TCI domain indication information only needs to include the reference signal identifier corresponding to the third antenna panel, and the reference signal identifier indicates both an identifier of the receiving antenna panel and an identifier of the receiving beam. If the reference signal identifiers used by different antenna panels are the same, the reference signal identifier cannot used to distinguish the antenna panels. In this case, both the reference signal identifier and the identifier of the antenna panel are required. Since the reference signal identifier only indicates the identifier of the receiving beam but cannot indicate the identifier of the antenna panel, that is, if the reference signal identifier corresponding to the receiving beam is unique to an antenna panel, then the indication of the reference signal identifier is equivalent to indicating both the receiving antenna panel and the receiving beam at the same time, and if the reference signal identifier does not uniquely correspond to an antenna panel, then both the identifier of the receiving antenna panel and the receiving beam need to be indicated.

In an embodiment, in addition to the first time-frequency resource and the first TCI domain indication information configured to indicate the third antenna panel, the first DCI signaling in 310 may also include: a panel identifier of the first antenna panel or a reference signal identifier corresponding to the first antenna panel.

In the embodiment of the disclosure, in order to indicate the identifier of the first antenna panel at the base station, the first DCI signaling herein may also include the panel identifier of the first antenna panel, or instruct the reference signal identifier corresponding to the first antenna panel to indicate the identifier of the antenna panel. That is, if the reference signal identifier can uniquely correspond to one antenna panel, the indication of the reference signal identifier refers to indicating the antenna panel, if not, the identifier of the antenna panel needs to be clearly indicated.

In an embodiment, the first DCI signaling in 310 includes the first time-frequency resource and first TCI indication information for indicating the third antenna panel, the first TCI domain indication information includes a reference signal identifier corresponding to the third antenna panel, and/or a panel identifier of the third antenna panel. Correspondingly, when 320 is performed, the first antenna panel may be indicated by a sending location of the first DCI signaling, and the specific implementation process includes the following.

(1-1) A first control resource set (CORESET) resource of the first antenna panel configured to send the DCI signaling is determined from pre-defined CORESET configuration information.

(1-2) The first DCI signaling is sent to the first terminal on the first CORESET resource, so that after the first terminal receives the first DCI signaling on the first CORESET resource, the first antenna panel is determined according to the first CORESET resource, and the first time-frequency resource, the third antenna panel, and the first beam direction are determined according to the first DCI signaling.

The pre-defined CORESET configuration information in (1-1) includes a correspondence between a designated antenna panel of the base station and a designated CORESET resource. The CORESET resources corresponding to different antenna panels of the base station are different. In addition, each CORESET resource is only used by one antenna panel of the base station, but the same antenna panel can be configured with multiple CORESET resources.

For example, CORESET #1 of the first antenna panel is configured to send a PDCCH (Physical Downlink Control Channel) by the base station, the PDCCH is configured to indicate the first terminal to receive a PDSCH (Physical Downlink Shared Channel) on the designated time-frequency resource of the third antenna panel by the first beam direction.

It can be seen from the above embodiments that the first DCI signaling may be generated, and the first DCI signaling is configured to indicate the first terminal to receive the downlink data on the first time-frequency resource of the third antenna panel by the first beam direction. The first DCI signaling is sent to the first terminal, so that the first terminal receives the downlink data on the first time-frequency resource of the third antenna panel by the first beam direction according to the first DCI signaling, thereby increasing the reliability of resource indication.

In particular, when the first DCI signaling includes the first time-frequency resource and the first TCI domain indication information for indicating the third antenna panel, the first DCI signaling may also include the panel identifier of the first antenna panel or the reference signal identifier corresponding to the first antenna panel; or, the base station indicates the first antenna panel through the sending location of the first DCI signaling (that is, the first CORESET resource), thereby enriching the implementations of resource indication and improving the efficiency of resource indication.

Figure 4:
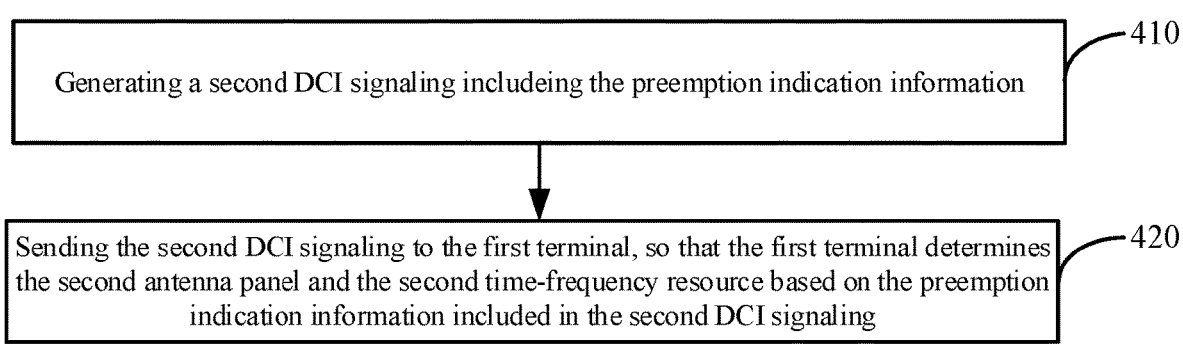
FIG. 4 is a flowchart of another resource indication method according to an exemplary embodiment.

FIG. 4 is a flowchart of another resource indication method according to an exemplary embodiment. This resource indication method can be applied in the base station and based on the method shown in FIG. 1. The preemption indication information includes the second time-frequency resource and the second antenna panel. When 140 is performed, as illustrated in FIG. 4, step 140 can include the following steps 410-420.

In 410, a second DCI signaling including the preemption indication information is generated.

In the embodiment of the disclosure, the base station may notify the first terminal of the second time-frequency resource and the second antenna panel through the second DCI signaling.

In 420, the second DCI signaling is sent to the first terminal, so that the first terminal determines the second antenna panel and the second time-frequency resource based on the preemption indication information included in the second DCI signaling.

It can be seen from the above embodiments that when the second time-frequency resource and the second antenna panel are included in the preemption indication information, the first terminal can be informed of the preemption indication information through the second DCI signaling, thereby improving the reliability of transmitting the preemption indication information.

Figure 5:
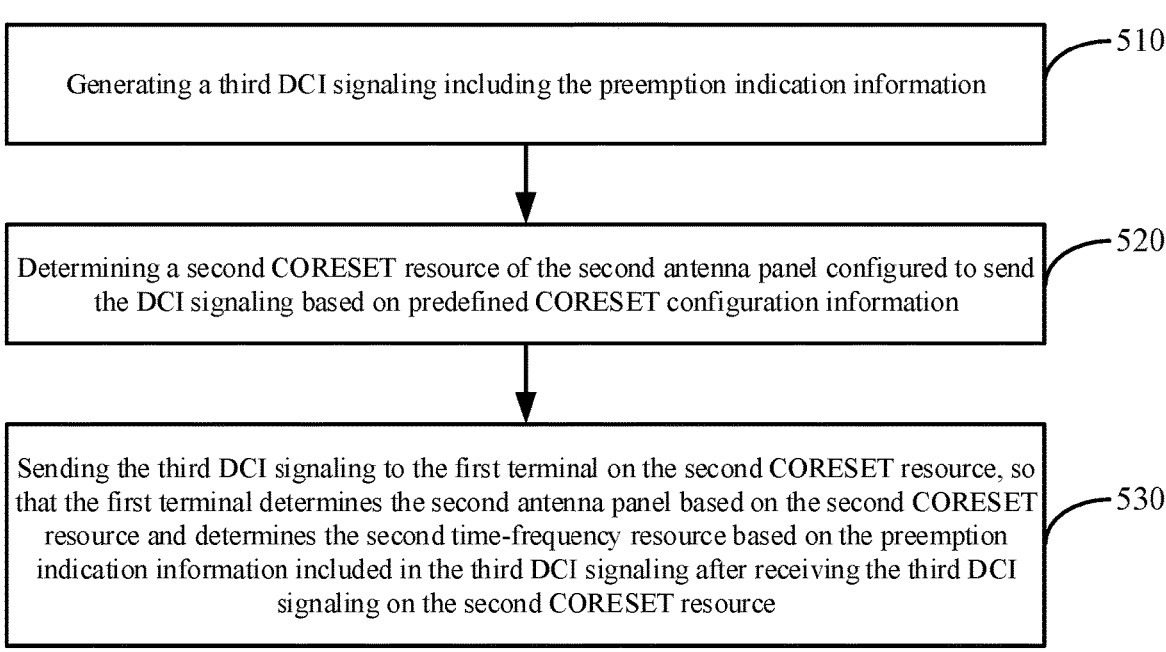
FIG. 5 is a flowchart of another resource indication method according to an exemplary embodiment.

FIG. 5 is a flowchart of another resource indication method according to an exemplary embodiment. This resource indication method can be applied in the base station and based on the method shown in FIG. 1. The preemption indication information includes the second time-frequency resource. When 140 is performed, as illustrated in FIG. 5, 140 may include the following steps 510-530.

In 510, a third DCI signaling including the preemption indication information is generated.

In the embodiment of the disclosure, the base station may notify the first terminal of the second time-frequency resource through the third DCI signaling, and notify the first terminal of the second antenna panel through a sending location of the third DCI signaling.

In 520, a second CORESET resource of the second antenna panel configured to send the DCI signaling is determined based on predefined CORESET configuration information.

In the embodiment of the disclosure, the predefined CORESET configuration information in 520 may include a correspondence between a designated antenna panel of the base station and a designated CORESET resource. The CORESET resources corresponding to different antenna panels of the base station can be different, and each CORESET resource is only used by one antenna panel of the base station, but the same antenna panel can be configured with multiple CORESET resources.

For example, the second CORESET resource of the second antenna panel of the base station configured to send the DCI signaling is CORESET #3.

In 530, the third DCI signaling is sent to the first terminal on the second CORESET resource, so that the first terminal determines the second antenna panel based on the second CORESET resource and determines the second time-frequency resource based on the preemption indication information included in the third DCI signaling after receiving the third DCI signaling on the second CORESET resource.

It can be seen from the above embodiments that only the second time-frequency resource is included in the preemption indication information, and the second time-frequency resource can be notified to the first terminal through the third DCI signaling. The second antenna panel is notified to the first terminal through the sending location of the third DCI signaling (that is, the second CORESET resource), thereby enriching the implementations of the preemption indication and improving the efficiency of resource prompting.

Figure 6:
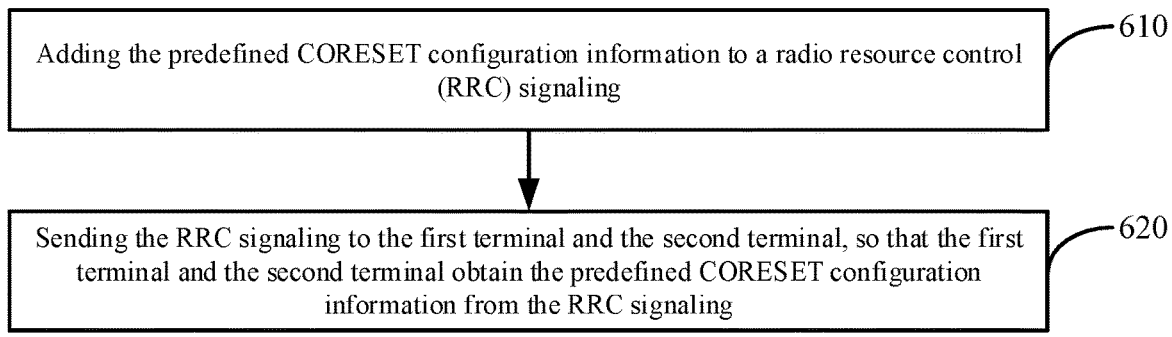
FIG. 6 is a flowchart of another resource indication method according to an exemplary embodiment.

FIG. 6 is a flowchart of another resource indication method according to an exemplary embodiment. The resource indication method may be applied in a base station and based on the method shown in FIG. 3 or FIG. 5. The predefined CORESET configuration information includes a correspondence between a designated antenna panel of the base station and a designated CORESET resource. As illustrated in FIG. 6, the resource indication method may further include the following steps 610-620.

In 610, the predefined CORESET configuration information is added to a radio resource control (RRC) signaling. In the embodiment of the disclosure, the base station may notify the first terminal and the second terminal of the pre-defined CORESET configuration information through the RRC signaling.

In 620, the RRC signaling is sent to the first terminal and the second terminal, so that the first terminal and the second terminal obtain the predefined CORESET configuration information from the RRC signaling.

It can be seen from the above embodiment that the pre-defined CORESET configuration information can be notified to the first terminal and the second terminal through the RRC signaling, so that the first terminal and the second terminal can determine the antenna panel configured to send the downlink data by the base station according to the predefined CORESET configuration information, thereby reducing the energy consumption of the resource indication.

Figure 7:
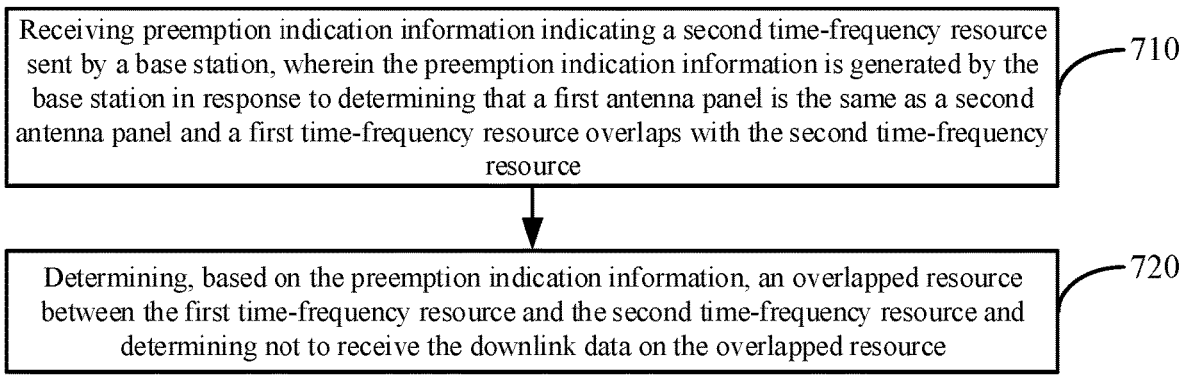
FIG. 7 is a flowchart of a resource indication method according to an exemplary embodiment.

FIG. 7 is a flowchart of a resource indication method according to an exemplary embodiment. The resource indication method may be applied in a first terminal, and the first terminal may represent a terminal with resources occupied. As illustrated in FIG. 7, the resource indication method may further include the following steps 710-720.

In 710, preemption indication information indicating a second time-frequency resource sent by a base station is received, the preemption indication information is generated by the base station in response to determining that a first antenna panel is the same as a second antenna panel and a first time-frequency resource overlaps with the second time-frequency resource, and the first antenna panel and the first time-frequency resource are configured to send downlink data to the first terminal by the base station, and the second antenna panel and the second time-frequency resource are configured to send the downlink data to a second terminal by the base station.

In the embodiment of the disclosure, the base station sends the preemption indication information to the first terminal only when the first antenna panel is the same as the second antenna panel and the first time-frequency resource overlaps with the second time-frequency resource. The term "overlap" herein may refer to that the first time-frequency resource partially or completely overlaps with the second time-frequency resource.

In 720, based on the preemption indication information, an overlapped resource between the first time-frequency resource and the second time-frequency resource is determined and it is determined not to receive the downlink data on the overlapped resource.

In an embodiment, based on the method shown in FIG. 7, the resource indication method may further include the following.

(2-1) a first DCI signaling sent by the base station is received. The first DCI signaling is configured to indicate that the base station sends the downlink data to the first terminal on the first time-frequency resource by using the first antenna panel, and to indicate the first terminal to receive the downlink data on the first time-frequency resource of the third antenna panel by the first beam direction.

(2-2) The downlink data is received on the first time-frequency resource of the third antenna panel by the first beam direction according to the first DCI signaling. The first beam direction of the third antenna panel is directed to the first terminal side.

In an embodiment, the first DCI signaling in (2-1) may include the first time-frequency resource and first TCI domain indication information for indicating the third antenna panel.

The first TCI domain indication information includes a reference signal identifier corresponding to the third antenna panel, and/or a panel identifier of the third antenna panel.

In an embodiment, the first DCI signaling in (2-1) may further include a panel identifier of the first antenna panel or a reference signal identifier corresponding to the first antenna panel.

In an embodiment, the first DCI signaling in (2-1) may include the first time-frequency resource and first TCI domain indication information for indicating the third antenna panel. The first TCI domain indication information includes the reference signal identifier corresponding to the third antenna panel, and/or the panel identifier of the third antenna panel. Correspondingly, (2-1) may include: receiving the first DCI signaling on a first CORESET resource, and determining the first antenna panel according to the first CORESET resource, and determining the first time-frequency resource, the third antenna panel, and the first beam direction according to the first DCI signaling.

In an embodiment, based on the method shown in FIG. 7, the preemption indication information includes the second time-frequency resource and the second antenna panel. Step 710 includes the following.

(3-1) A second DCI signaling sent by the base station is received. The second DCI signaling includes the preemption indication information.

(3-2) The second time-frequency resource and the second antenna panel are determined according to the preemption indication information included in the second DCI signaling.

In an embodiment, based on the method shown in FIG. 7, the preemption indication information includes the second time-frequency resource. Step 710 may include the following.

(4-1) A third DCI signaling sent by the base station is received on a second CORESET resource, and the third DCI signaling includes the preemption indication information.

(4-2) The second antenna panel corresponding to the second CORESET resource is determined from predefined CORESET configuration information.

(4-3) The second time-frequency resource is determined according to the preemption indication information included in the third DCI signaling.

In an embodiment, based on the above method, step 720 can include the following.

(5-1) It is determined whether the second antenna panel is the same as the first antenna panel.

(5-2) If the second antenna panel is the same as the first antenna panel, it is determined whether the first time-frequency resource overlaps with the second time-frequency resource.

(5-3) If the first time-frequency resource overlaps with the second time-frequency resource, an overlapped resource between the first time-frequency resource and the second time-frequency resource is determined, and it is determined not to receive the downlink data on the overlapped resource.

In an embodiment, based on the above method, the predefined CORESET configuration information includes a correspondence between a designated antenna panel of the base station and a designated CORESET resource. The resource indication method may also include the following.

(6-1) A RRC signaling sent by the base station is received, and the RRC signaling includes the predefined CORESET configuration information.

(6-2) The predefined CORESET configuration information is obtained from the RRC signaling.

It can be seen from the above embodiments that when the preemption indication information for indicating the second time-frequency resource sent by the base station is received, in which the preemption indication information is generated by the base station when it determines that the first antenna panel is the same as the second antenna panel and the first time-frequency resource overlaps with the second time-frequency resource, based on the preemption indication information, the overlapped resource between the first time-frequency resource and the second time-frequency resource is determined and it is determined not to receive the downlink data on the overlapped resource, which ensures resource usage diversity between terminals of different business types, and also improves the accuracy of resource indication.

Corresponding to the above embodiments of the resource indication method, the disclosure also provides embodiments of a resource indication apparatus.

Figure 8:
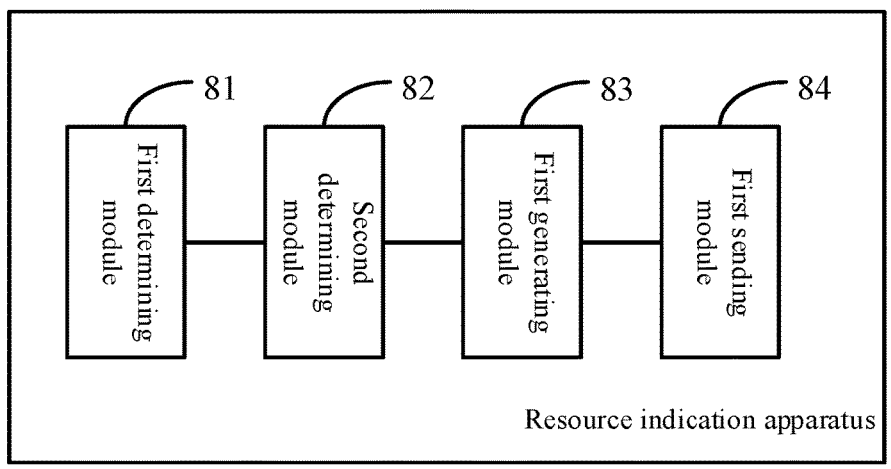
FIG. 8 is a block diagram of a resource indication apparatus according to an exemplary embodiment.

FIG. 8 is a block diagram of a resource indication apparatus according to an exemplary embodiment. The apparatus is used in a base station and used to execute the resource indication method shown in FIG. 1. As illustrated in FIG. 8, the resource indication apparatus may include a first determining module 81, a second determining module 82, a first generating module 83 and a first sending module 84.

The first determining module 81 is configured to determine a first time-frequency resource of a first antenna panel configured to send downlink data to a first terminal.

The second determining module 82 is configured to determine a second time-frequency resource of a second antenna panel configured to send downlink data to a second terminal.

The first generating module 83 is configured to generate preemption indication information indicating the second time-frequency resource in response to determining that the first antenna panel is the same as the second antenna panel and the first time-frequency resource overlaps with the second time-frequency resource.

The first sending module 84 is configured to send the preemption indication information to the first terminal, such that the first terminal determines, based on the preemption indication information, an overlapped resource between the first time-frequency resource and the second time-frequency resource, and determines not to receive the downlink data on the overlapped resource.

It can be seen from the above embodiments that after the first time-frequency resource the first antenna panel configured to send the downlink data to the first terminal is determined, and the second time-frequency resource of the second antenna panel configured to send the downlink data to the second terminal, only when the first antenna panel is the same as the second antenna panel and the first time-frequency resource overlaps with the second time-frequency resource, the preemption indication information is generated, and the preemption indication information is configured to indicate the second time-frequency resource, and is sent to the first terminal, so that the first terminal can determine, based on the preemption indication information, the overlapped resource between the first time-frequency resource and the second time-frequency resource and determine not to receive the downlink data on the overlapped resource, thereby ensuring resource usage diversity between terminals of different business types, and also improving the accuracy of resource indication.

Figure 9:
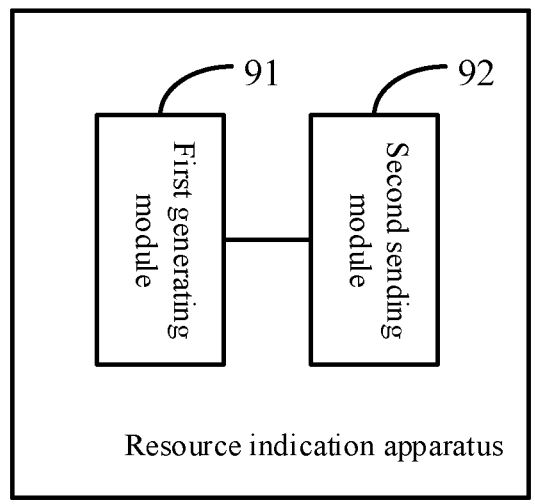
FIG. 9 is a block diagram of another resource indication apparatus according to an exemplary embodiment.

In an embodiment, based on the apparatus shown in FIG. 8, as illustrated in FIG. 9, the apparatus may also include a second generating module 91 and a second sending module 92.

The second generating module 91 is configured to generate a first downlink control information (DCI) signaling. The first DCI signaling is configured to indicate the first terminal to receive the downlink data on the first time-frequency resource of a third antenna panel by a first beam direction.

The second sending module 92 is configured to send the first DCI signaling to the first terminal, so that the first terminal receives the downlink data on the first time-frequency resource of the third antenna panel by the first beam direction based on the first DCI signaling.

In an embodiment, based on the apparatus shown in FIG. 9, the first DCI signaling includes the first time-frequency resource and first TCI domain indication information for indicating the third antenna panel.

The first TCI domain indication information includes a reference signal identifier corresponding to the third antenna panel, and/or a panel identifier of the third antenna panel.

In an embodiment, based on the above apparatus, the first DCI signaling further includes a panel identifier of the first antenna panel or a reference signal identifier corresponding to the first antenna panel.

Figure 10:
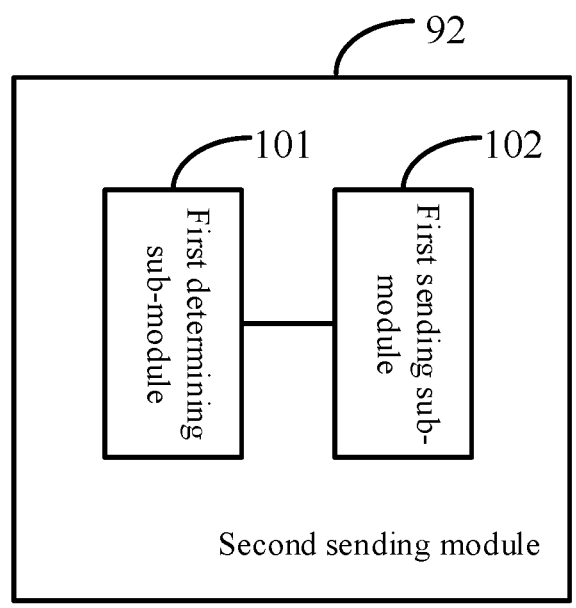
FIG. 10 is a block diagram of another resource indication apparatus according to an exemplary embodiment.

In an embodiment, based on the apparatus shown in FIG. 9, the first DCI signaling includes the first time-frequency resource and first TCI domain indication information for indicating the third antenna panel, and the first TCI domain indication information includes a reference signal identifier corresponding to the third antenna panel, and/or a panel identifier of the third antenna panel. Correspondingly, as illustrated in FIG. 10, the second sending module 92 may include a first determining sub-module 101 and a first sending sub-module 102.

The first determining sub-module 101 is configured to determine a first control resource set (CORESET) resource of the first antenna panel configured to send the first DCI signaling based on predefined CORESET configuration information.

The first sending sub-module 102 is configured to send the first DCI signaling to the first terminal on the first CORESET resource, so that the first terminal determines the first antenna panel based on the first CORESET resource and determines the first time-frequency resource, the third antenna panel, and the first beam direction based on the first DCI signaling after receiving the first DCI signaling on the first CORESET resource.

It can be seen from the above embodiments that the first DCI signaling may be generated, and the first DCI signaling is configured to indicate the first terminal to receive the downlink data on the first time-frequency resource of the third antenna panel by the first beam direction, and the first DCI signaling is sent to the first terminal, so that the first terminal can receive the downlink data on the first time-frequency resource of the third antenna panel by the first beam direction according to the first DCI signaling, thereby increasing the reliability of resource indication.

In particular, when the first DCI signaling includes the first time-frequency resource and the first TCI domain indication information for indicating the third antenna panel, the first DCI signaling may also include the panel identifier of the first antenna panel or the reference signal identifier corresponding to the first antenna panel; or, the base station indicates the first antenna panel through a sending location of the first DCI signaling (that is, the first CORESET resource), thereby enriching the implementations of resource indication, and improving the efficiency of resource indication.

Figure 11:
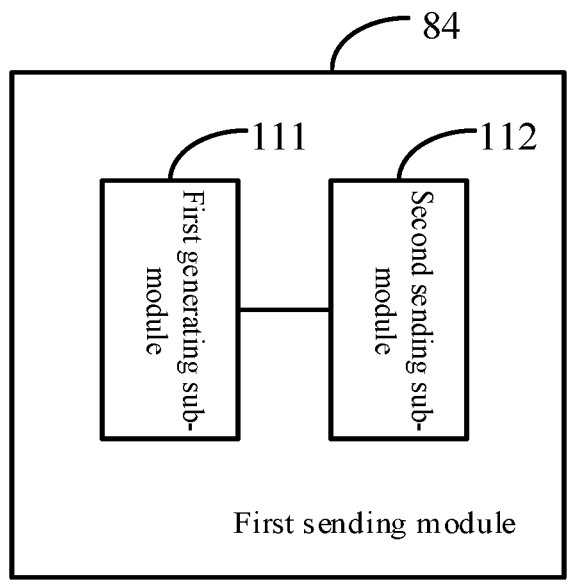
FIG. 11 is a block diagram of another resource indication apparatus according to an exemplary embodiment.

In an embodiment, based on the apparatus shown in FIG. 8, as illustrated in FIG. 11, the preemption indication information includes the second time-frequency resource and the second antenna panel, the first sending module 84 may include a first generating sub-module 111 and a second sending sub-module 112.

The first generating sub-module 111 is configured to generate a second DCI signaling including the preemption indication information.

The second sending sub-module 112 is configured to send the second DCI signaling to the first terminal, so that the first terminal determines the second antenna panel and the second time-frequency resource based on the preemption indication information included in the second DCI signaling.

It can be seen from the above embodiments that when the preemption indication information includes the second time-frequency resource and the second antenna panel, the first terminal is notified of the preemption indication information through the second DCI signaling, thereby improving the reliability of transmitting the preemption indication information.

Figure 12:
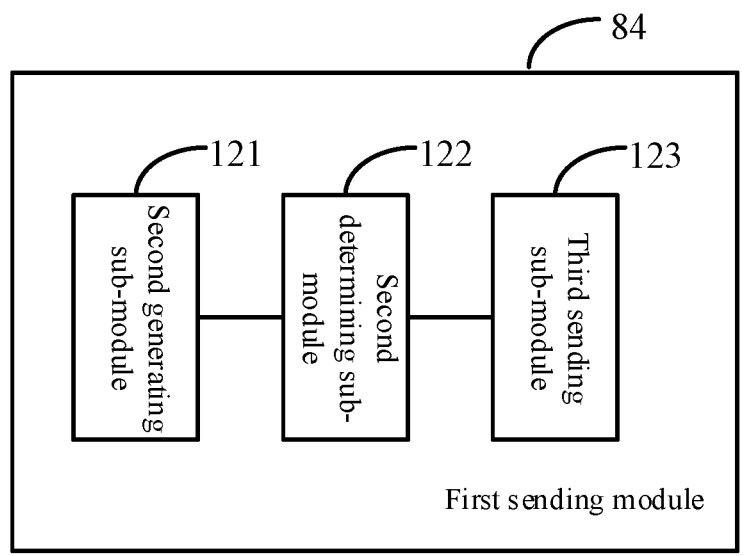
FIG. 12 is a block diagram of another resource indication apparatus according to an exemplary embodiment.

In an embodiment, based on the apparatus shown in FIG. 8, as illustrated in FIG. 12, the preemption indication information includes the second time-frequency resource, and the first sending module 84 may include a second generating sub-module 121, a second determining sub-module 122 and a third sending sub-module 123.

The second generating sub-module 121 is configured to generate a third DCI signaling including the preemption indication information.

The second determining sub-module 122 is configured to determine a second CORESET resource of the second antenna panel configured to send the DCI signaling based on predefined CORESET configuration information.

The third sending sub-module 123 is configured to send the third DCI signaling to the first terminal on the second CORESET resource, so that the first terminal determines the second antenna panel based on the second CORESET resource and determines the second time-frequency resource based on the preemption indication information included in the third DCI signaling after receiving the third DCI signaling on the second CORESET resource.

It can be seen from the above embodiments that when only the second time-frequency resource is included in the preemption indication information, the second time-frequency resource is notified to the first terminal through the third DCI signaling and the second antenna panel is notified to the first terminal through a sending location of the third DCI signaling (that is, the second CORESET resource), thereby enriching the implementations of the preemption indication and improving the efficiency of resource prompting.

Figure 13:
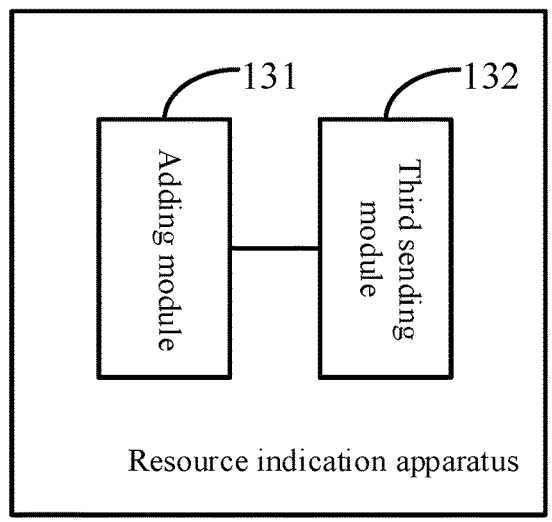
FIG. 13 is a block diagram of another resource indication apparatus according to an exemplary embodiment.

In an embodiment, based on the apparatus shown in FIG. 10 or FIG. 12, as illustrated in FIG. 13, the predefined CORESET configuration information includes a correspondence between a designated antenna panel of the base station and a designated CORESET resource, and the apparatus may further include an adding module 131 and a third sending module 132.

The adding module 131 is configured to add the predefined CORESET configuration information to a radio resource control (RRC) signaling.

The third sending module 132 is configured to send the RRC signaling to the first terminal and the second terminal, so that the first terminal and the second terminal obtain the predefined CORESET configuration information from the RRC signaling.

It can be seen from the above embodiments that the predefined CORESET configuration information may be notified to the first terminal and the second terminal through the RRC signaling, so that the first terminal and the second terminal can determine the antenna panel configured to send the downlink data by the base station according to the predefined CORESET configuration information, thereby reducing the energy consumption of the resource indication.

Figure 14:
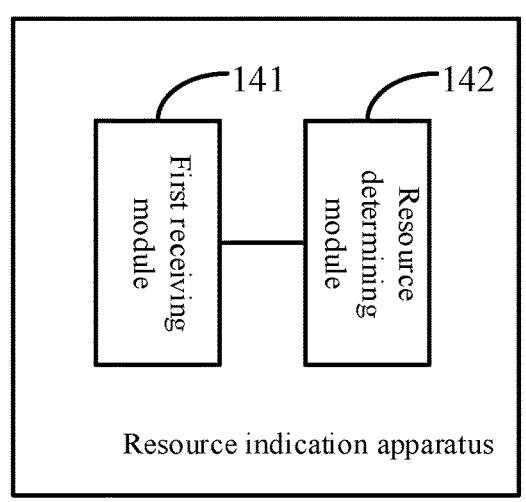
FIG. 14 is a block diagram of a resource indication apparatus according to an exemplary embodiment.

FIG. 14 is a block diagram of a resource indication apparatus according to an exemplary embodiment. The apparatus is used in a first terminal and used to execute the resource indication method shown in FIG. 7. As illustrated in FIG. 14, the resource indication apparatus may include a first receiving module 141 and a resource determining module 142.

The first receiving module 141 is configured to receive preemption indication information indicating a second time-frequency resource sent by a base station, the preemption indication information is generated by the base station in response to determining that a first antenna panel is the same as a second antenna panel and a first time-frequency resource overlaps with the second time-frequency resource. The first antenna panel and the first time-frequency resource are configured to send downlink data to the first terminal by the base station, and the second antenna panel and the second time-frequency resource are configured to send the downlink data to a second terminal by the base station.

The resource determining module 142 is configured to determine, based on the preemption indication information, an overlapped resource between the first time-frequency resource and the second time-frequency resource and determine not to receive the downlink data on the overlapped resource.

Figure 15:
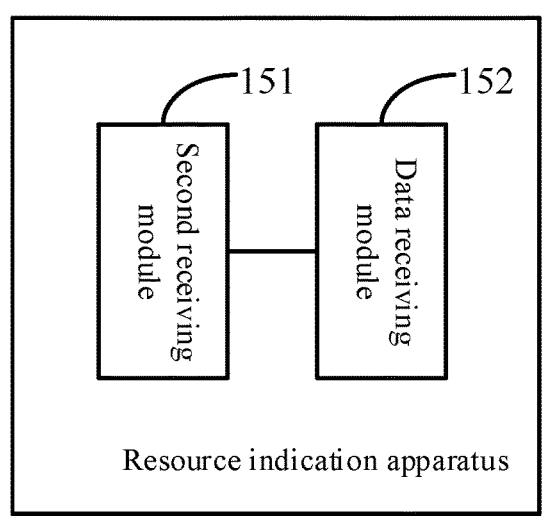
FIG. 15 is a block diagram of another resource indication apparatus according to an exemplary embodiment.

In an embodiment, based on the apparatus shown in FIG. 14, as illustrated in FIG. 15, the apparatus may further include a second receiving module 151 and a data receiving module 152.

The second receiving module 151 is configured to receive a first downlink control information (DCI) signaling sent by the base station, the first DCI signaling is configured to indicate that the base station sends the downlink data to the first terminal on the first time-frequency resource of the first antenna panel, and indicate the first terminal to receive the downlink data on the first time-frequency resource of a third antenna panel by a first beam direction.

The data receiving module 152 is configured to receive the downlink data on the first time-frequency resource of the third antenna panel by the first beam direction based on the first DCI signaling.

In an embodiment, based on the apparatus shown in FIG. 15, the first DCI signaling includes the first time-frequency resource and first TCI domain indication information indicating the third antenna panel.

The first TCI domain indication information includes a reference signal identifier corresponding to the third antenna panel, and/or a panel identifier of the third antenna panel.

In an embodiment, based on the above apparatus, the first DCI signaling further includes a panel identifier of the first antenna panel or a reference signal identifier corresponding to the first antenna panel.

Figure 16:
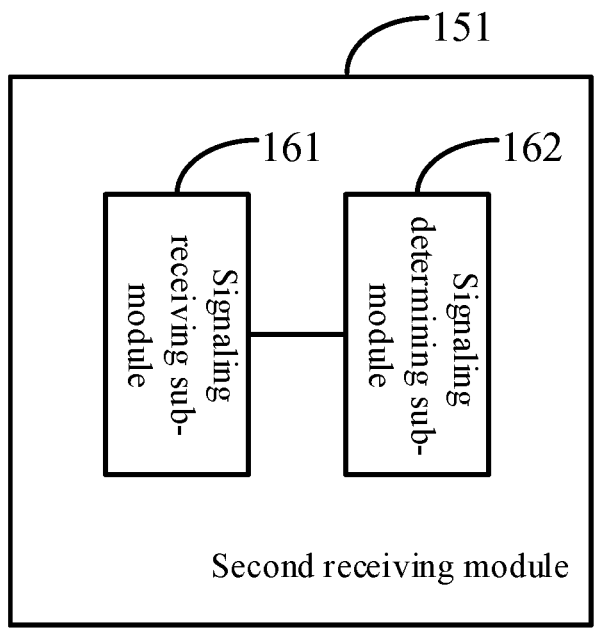
FIG. 16 is a block diagram of another resource indication apparatus according to an exemplary embodiment.

In an embodiment, based on the apparatus shown in FIG. 15, the first DCI signaling includes the first time-frequency resource and first TCI domain indication information for indicating the third antenna panel, and the first TCI domain indication information includes a reference signal identifier corresponding to the third antenna panel, and/or a panel identifier of the third antenna panel. Correspondingly, as illustrated in FIG. 16, the second receiving module 151 may include a signaling receiving sub-module 161 and a signaling determining sub-module 162.

The signaling receiving sub-module 161 is configured to receive the first DCI signaling on a first CORESET resource.

The signaling determining sub-module 162 is configured to determine the first antenna panel based on the first CORESET resource, and determine the first time-frequency resource, the third antenna panel, and the first beam direction based on the first DCI signaling.

Figure 17:
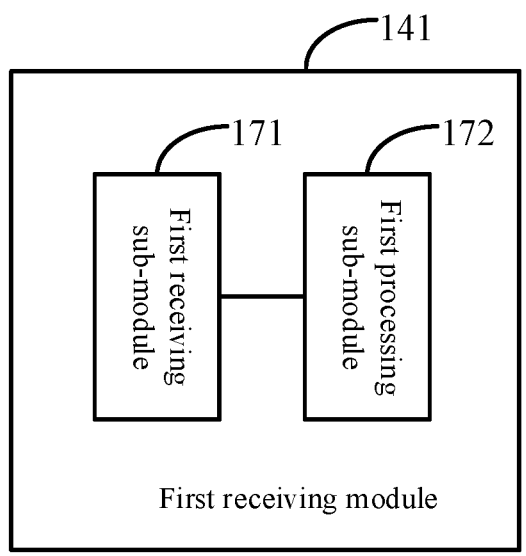
FIG. 17 is a block diagram of another resource indication apparatus according to an exemplary embodiment.

In an embodiment, based on the apparatus in FIG. 14, as illustrated in FIG. 17, the preemption indication information includes the second time-frequency resource and the second antenna panel, and the first receiving module 141 may include a first receiving sub-module 171 and a first processing sub-module 172.

The first receiving sub-module 171 is configured to receive a second DCI signaling including the preemption indication information sent by the base station.

The first processing sub-module 172 is configured to determine the second time-frequency resource and the second antenna panel based on the preemption indication information included in the second DCI signaling.

Figure 18:
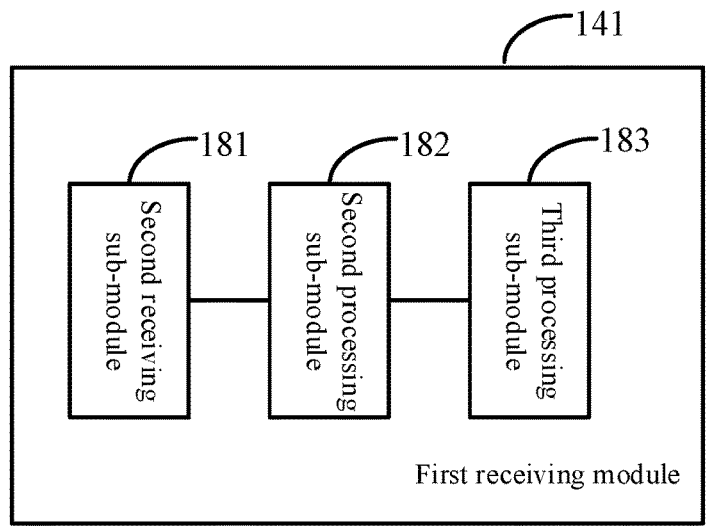
FIG. 18 is a block diagram of another resource indication apparatus according to an exemplary embodiment.

In an embodiment, based on the apparatus in FIG. 14, as illustrated in FIG. 18, the preemption indication information includes the second time-frequency resource, and the first receiving module 141 may include a second receiving sub-module 181, a second processing sub-module 182 and a third processing sub-module 183.

The second receiving sub-module 181 is configured to receive a third DCI signaling including the preemption indication information sent by the base station on a second CORESET resource.

The second processing sub-module 182 is configured to determine the second antenna panel corresponding to the second CORESET resource based on predefined CORESET configuration information.

The third processing sub-module 183 is configured to determine the second time-frequency resource based on the preemption indication information included in the third DCI signaling.

Figure 19:
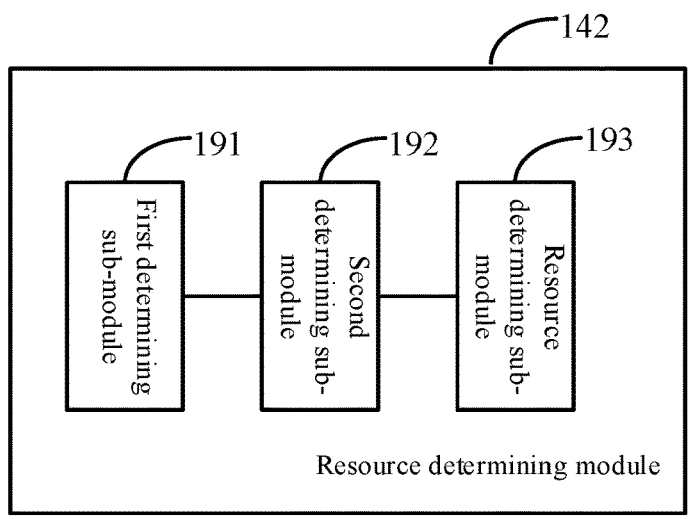
FIG. 19 is a block diagram of another resource indication apparatus according to an exemplary embodiment.

In an embodiment, based on the apparatus shown in FIG. 17 or FIG. 18, as illustrated in FIG. 19, the resource determining module 142 may include a first determining sub-module 191, a second determining sub-module 192 and a resource determining sub-module 193.

The first determining sub-module 191 is configured to determine whether the second antenna panel is the same as the first antenna panel.

The second determining sub-module 192 is configured to determine whether the first time-frequency resource overlaps with the second time-frequency resource in response to determining that the second antenna panel is the same as the first antenna panel.

The resource determining sub-module 193 is configured to determine the overlapped resource between the first time-frequency resource and the second time-frequency resource and determine not to receive the downlink data on the overlapped resource in response to determining that the first time-frequency resource overlaps with the second time-frequency resource.

Figure 20:
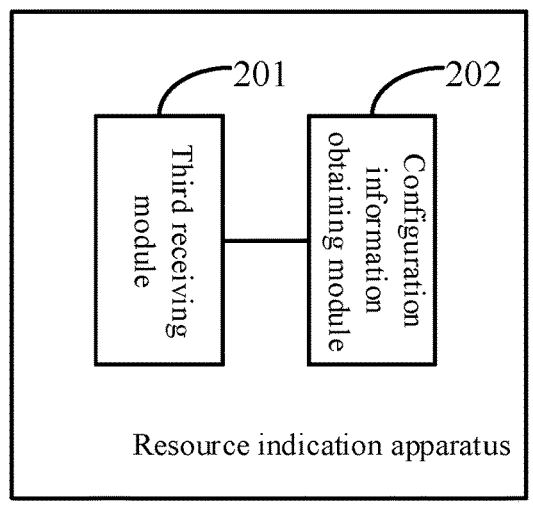
FIG. 20 is a block diagram of another resource indication apparatus according to an exemplary embodiment.

In an embodiment, based on the apparatus shown in FIG. 18, as illustrated in FIG. 20, the predefined CORESET configuration information includes a correspondence between a designated antenna panel of the base station and a designated CORESET resource, and the apparatus may further include a third receiving module 201 and a configuration information obtaining module 202.

The third receiving module 201 is configured to receive a radio resource control (RRC) signaling including the predefined CORESET configuration information sent by the base station.

The configuration information obtaining module 202 is configured to obtain the predefined CORESET configuration information from the RRC signaling.

It can be seen from the above embodiments that when the preemption indication information for indicating the second time-frequency resource sent by the base station is received, in which the preemption indication information is generated by the base station when it determines that the first antenna panel is the same as the second antenna panel and the first time-frequency resource overlaps with the second time-frequency resource, based on the preemption indication information, the overlapped resource between the first time-frequency resource and the second time-frequency resource is determined and it is determined not to receive the downlink data on the overlapped resource, which ensures resource usage diversity between terminals of different business types, and also improves the accuracy of resource indication.

The apparatus embodiments correspond to the method embodiments, and the relevant part can refer to the part of the description of the method embodiments. The apparatus embodiments described above are merely illustrative. The units described above as separate components may or may not be physically separated, and the components displayed as units may or may not be physical units, that is, the components may be located in one place, or on multiple network units. Some or all of the modules can be selected according to actual needs to achieve the objectives of the solution of the disclosure, which can be can understand and implemented by those of ordinary skill in the art without inventive works.

The disclosure provides a non-transitory computer-readable storage medium on which a computer program is stored, and the computer program is used to execute the resource indication method described with reference to any one of FIGS. 1 to 6.

The disclosure also provides a non-transitory computer-readable storage medium on which a computer program is stored, and the computer program is used to execute the resource indication method with reference to FIG. 7.

Embodiments of the disclosure provide a resource indication apparatus, applied to a base station. The apparatus includes: a processor and a memory for storing instructions executable by the processor.

The processor is configured to: determine a first time-frequency resource of a first antenna panel configured to send downlink data to a first terminal; determine a second time-frequency resource of a second antenna panel configured to send downlink data to a second terminal; generate preemption indication information indicating the second time-frequency resource in response to determining that the first antenna panel is the same as the second antenna panel and the first time-frequency resource overlaps with the second time-frequency resource; and send the preemption indication information to the first terminal, such that the first terminal determines, based on the preemption indication information, an overlapped resource between the first time-frequency resource and the second time-frequency resource, and determines not to receive the downlink data on the overlapped resource.

Figure 21:
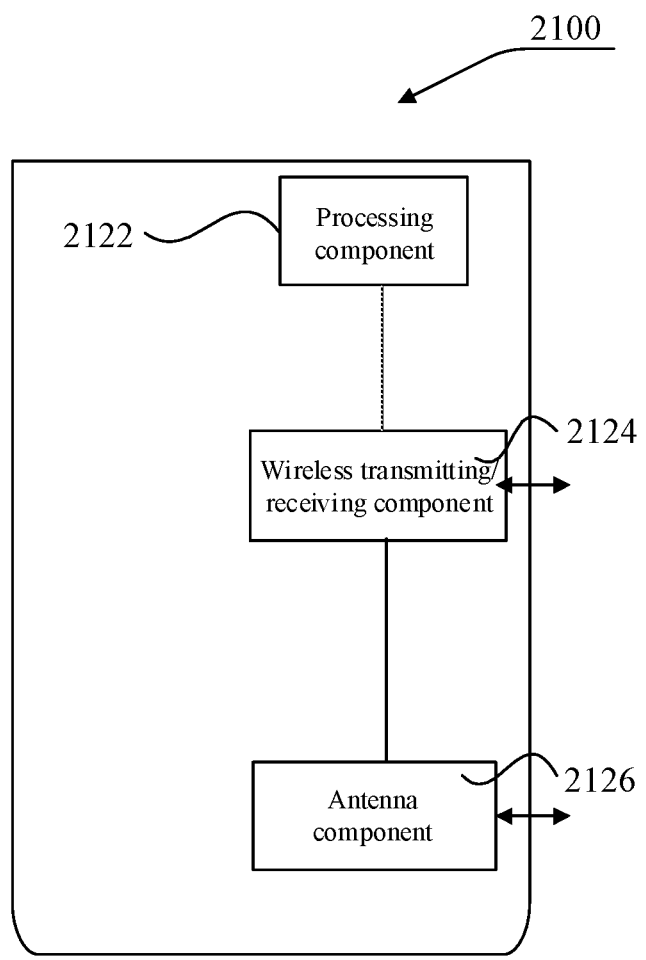
FIG. 21 is a schematic diagram of a resource indication apparatus according to an exemplary embodiment.

As illustrated in FIG. 21, FIG. 21 is a schematic diagram of a resource indication apparatus according to an exemplary embodiment. The apparatus 2100 may be provided as a base station. With reference to FIG. 21, the apparatus 2100 includes a processing component 2122, a wireless transmitting/receiving component 2124, an antenna component 2126, and a signal processing part specific to a wireless interface. The processing component 2122 may further include one or more processors.

One of the processors in the processing component 2122 may be configured to execute any of the above resource indication methods.

Embodiments of the disclosure provide a resource indication apparatus, applied to a first terminal. The apparatus includes a processor and a memory for storing instructions executable by the processor.

The processor is configured to: receive preemption indication information indicating a second time-frequency resource sent by a base station, in which the preemption indication information is generated by the base station in response to determining that a first antenna panel is the same as a second antenna panel and a first time-frequency resource overlaps with the second time-frequency resource; the first antenna panel and the first time-frequency resource are configured to send downlink data to the first terminal by the base station, and the second antenna panel and the second time-frequency resource are configured to send the downlink data to a second terminal by the base station; and determine, based on the preemption indication information, an overlapped resource between the first time-frequency resource and the second time-frequency resource and determine not to receive the downlink data on the overlapped resource.

Figure 22:
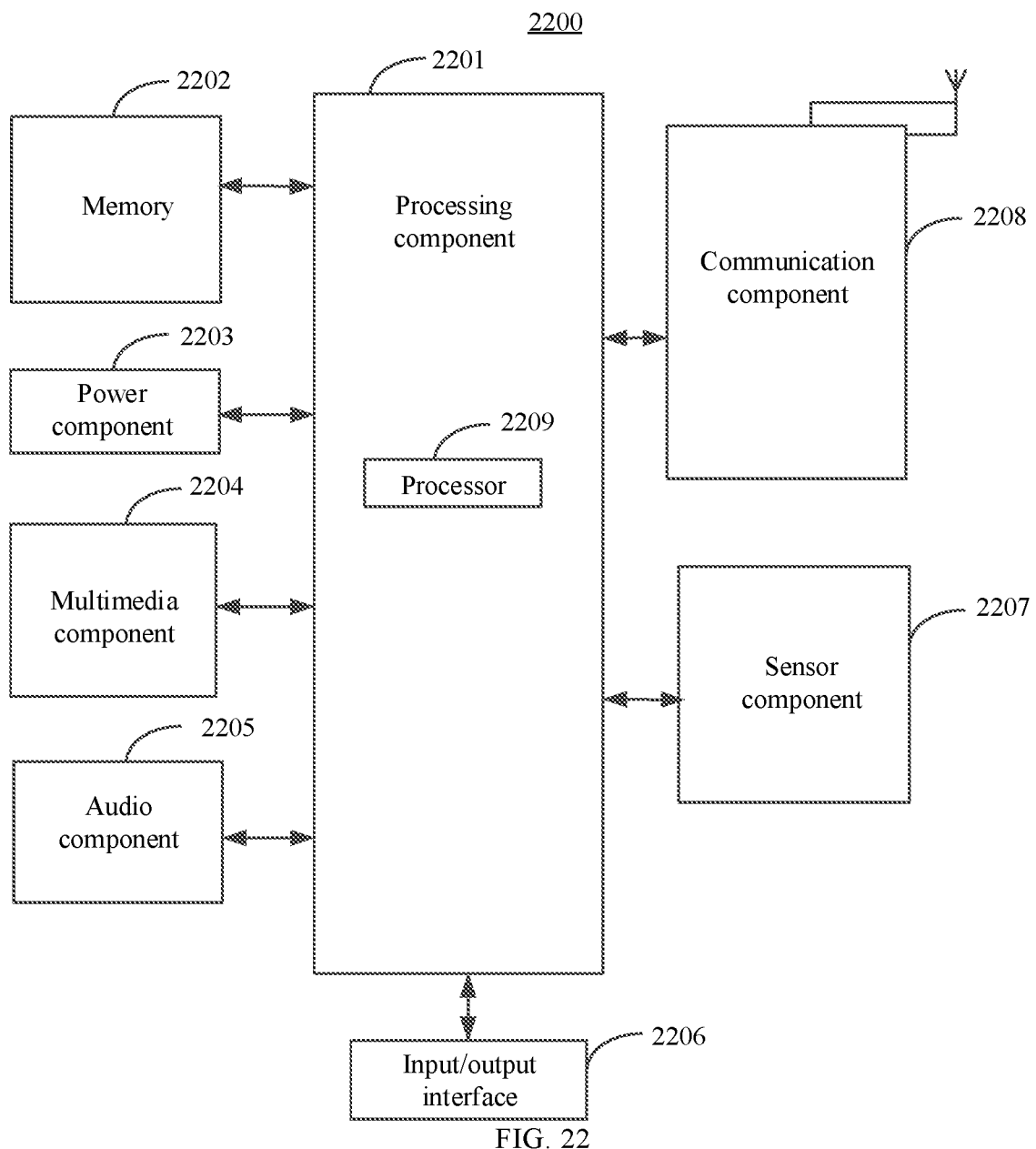
FIG. 22 is a schematic diagram of a resource indication apparatus according to an exemplary embodiment.

FIG. 22 is a schematic diagram of a resource indication apparatus according to an exemplary embodiment. As illustrated in FIG. 22, a resource indication apparatus 2200 is shown according to an exemplary embodiment. The apparatus 2200 may be a mobile phone, a computer, a digital broadcasting terminal, a message transceiver device, a game console, a tablet device, a medical device, a fitness device, a personal digital assistant and the like.

With reference to FIG. 22, the apparatus 2200 may include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 typically controls overall operations of the apparatus 2200, such as the operations associated with display, telephone calls, data communications, camera operations, and recording operations. The processing component 2201 may include one or more processors 2209 to execute instructions to perform all or part of the steps in the above described method. Moreover, the processing component 2201 may include one or more modules which facilitate the interaction between the processing component 2201 and other components. For instance, the processing component 2201 may include a multimedia module to facilitate the interaction between the multimedia component 2204 and the processing component 2201.

The memory 2202 is configured to store various types of data to support the operation of the apparatus 2200. Examples of such data include instructions for any applications or methods operated on the apparatus 2200, contact data, phonebook data, messages, pictures, video, etc. The memory 2202 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 2203 provides power to various components of the apparatus 2200. The power component 2203 may include a power management system, one or more power sources, and any other components associated with the generation, management, and distribution of power in the apparatus 2200.

The multimedia component 2204 includes a screen providing an output interface between the apparatus 2200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and the pressure associated with the touch or swipe action. In some embodiments, the multimedia component 2204 includes a front-facing camera and/or a rear-facing camera. When the apparatus 2200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2205 is configured to output and/or input audio signals. For example, the audio component 2205 includes a microphone (MIC) configured to receive an external audio signal when the apparatus 2200 is in an operation mode, such as a call mode, a recording mode, and a voice recognition mode. The received audio signal may be further stored in the memory 2202 or transmitted via the communication component 2208. In some embodiments, the audio component 2205 further includes a speaker to output audio signals.

The I/O interface 2206 provides an interface between the processing component 2201 and peripheral interface modules, such as a keyboard, a click wheel, buttons, and the like. The buttons may include, but are not limited to, a home button, a volume button, a starting button, and a locking button.

The sensor component 2207 includes one or more sensors to provide status assessments of various aspects of the apparatus 2200. For instance, the sensor component 2207 may detect an open/closed status of the apparatus 2200, relative positioning of components, e.g., the display and the keypad, of the apparatus 2200, a change in position of the apparatus 2200 or a component of the apparatus 2200, a presence or absence of user contact with the apparatus 2200, an orientation or an acceleration/deceleration of the apparatus 2200, and a change in temperature of the apparatus 2200. The sensor component 2207 may include a proximity sensor configured to detect the presence of nearby objects without any physical contact. The sensor component 2207 may also include a light sensor, such as a CMOS or CCD image sensor, for use in imaging applications. In some embodiments, the sensor component 2207 may also include an accelerometer sensor, a gyroscope sensor, a magnetic sensor, a pressure sensor, or a temperature sensor.

The communication component 2208 is configured to facilitate communication, wired or wirelessly, between the apparatus 2200 and other devices. The apparatus 2200 can access a wireless network based on a communication standard, such as Wi-Fi, 2G, or 3G, or a combination thereof. In an exemplary embodiment, the communication component 2208 receives a broadcast signal or broadcast associated information from an external broadcast management system via a broadcast channel. In an exemplary embodiment, the communication component 2208 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as the memory 2202 including the instructions, executable by the processor 2209 in the apparatus 2200, for performing the above method. For example, the non-transitory computer-readable storage medium may be a ROM, a RAM, a CD-ROM, a magnetic tape, a floppy disc, an optical data storage device, and the like.

When the instructions in the storage medium are executed by the processor, the apparatus 2200 is enabled to execute any of the resource indication methods described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A resource indication method, applied to a base station, comprising:
   determining a first time-frequency resource of a first antenna panel configured to send downlink data to a first terminal;
   determining a second time-frequency resource of a second antenna panel configured to send downlink data to a second terminal;
   generating preemption indication information indicating the second time-frequency resource in response to determining that the first antenna panel is the same as the second antenna panel and the first time-frequency resource overlaps with the second time-frequency resource; and
   sending the preemption indication information to the first terminal, such that the first terminal determines, based on the preemption indication information, an overlapped resource between the first time-frequency resource and the second time-frequency resource, and determines not to receive the downlink data on the overlapped resource.

2. The method of claim 1, further comprising:
   generating a first downlink control information (DCI) signaling, wherein the first DCI signaling is configured to indicate the first terminal to receive the downlink data on the first time-frequency resource of a third antenna panel by a first beam direction; and
   sending the first DCI signaling to the first terminal, such that the first terminal receives the downlink data on the first time-frequency resource of the third antenna panel by the first beam direction based on the first DCI signaling.

3. The method of claim 2, wherein the first DCI signaling comprises the first time-frequency resource and first transmission configuration indication (TCI) domain indication information for indicating the third antenna panel, and
   the first TCI domain indication information comprises at least one of a reference signal identifier corresponding to the third antenna panel, and a panel identifier of the third antenna panel.

4. The method of claim 3, wherein the first DCI signaling further comprises at least one of a panel identifier of the first antenna panel and a reference signal identifier corresponding to the first antenna panel.

5. The method of claim 3, wherein sending the first DCI signaling to the first terminal comprises:
   determining a first control resource set (CORESET) resource of the first antenna panel configured to send the first DCI signaling based on predefined CORESET configuration information; and
   sending the first DCI signaling to the first terminal on the first CORESET resource, such that the first terminal determines the first antenna panel based on the first CORESET resource and determines the first time-frequency resource, the third antenna panel, and the first beam direction based on the first DCI signaling after receiving the first DCI signaling on the first CORESET resource.

6. The method of claim 5, wherein the predefined CORESET configuration information comprises a correspondence between a designated antenna panel and a designated CORESET resource, and the method further comprising:
   adding the predefined CORESET configuration information to a radio resource control (RRC) signaling; and
   sending the RRC signaling to the first terminal and the second terminal, such that the first terminal and the second terminal obtain the predefined CORESET configuration information from the RRC signaling.

7. The method of claim 1, wherein the preemption indication information comprises the second time-frequency resource and the second antenna panel; and
   sending the preemption indication information to the first terminal comprises:
   generating a second DCI signaling comprising the preemption indication information; and
   sending the second DCI signaling to the first terminal, such that the first terminal determines the second antenna panel and the second time-frequency resource based on the preemption indication information comprised in the second DCI signaling.

8. The method of claim 1, wherein the preemption indication information comprises the second time-frequency resource; and
   sending the preemption indication information to the first terminal comprises:
   generating a third DCI signaling comprising the preemption indication information;
   determining a second CORESET resource of the second antenna panel configured to send the third DCI signaling based on predefined CORESET configuration information; and
   sending the third DCI signaling to the first terminal on the second CORESET resource, such that the first terminal determines the second antenna panel based on the second CORESET resource and determines the second time-frequency resource based on the preemption indication information comprised in the third DCI signaling after receiving the third DCI signaling on the second CORESET resource.

9. A resource indication apparatus, applied to a base station, comprising:
   a processor;
   a memory for storing processor executable instructions; wherein,
   the processor is configured to execute the method according to claim 1.

10. A resource indication method, applied to a first terminal, comprising:
    receiving preemption indication information sent by a base station, wherein the preemption indication information is configured to indicate a second time-frequency resource and generated by the base station in response to determining that a first antenna panel is the same as a second antenna panel and a first time-frequency resource overlaps with the second time-frequency resource; wherein the first antenna panel and the first time-frequency resource are configured to send downlink data to the first terminal by the base station, and the second antenna panel and the second time-frequency resource are configured to send downlink data to a second terminal by the base station; and
    determining, based on the preemption indication information, an overlapped resource between the first time-frequency resource and the second time-frequency resource and determining not to receive the downlink data on the overlapped resource.

11. The method of claim 10, the method further comprising:
    receiving a first downlink control information (DCI) signaling sent by the base station, wherein the first DCI signaling is configured to indicate that the base station sends the downlink data to the first terminal on the first time-frequency resource of the first antenna panel, and indicate the first terminal to receive the downlink data on the first time-frequency resource of a third antenna panel by a first beam direction; and receiving the downlink data on the first time-frequency resource of the third antenna panel by the first beam direction based on the first DCI signaling.

12. The method of claim 11, wherein the first DCI signaling comprises the first time-frequency resource and first transmission configuration indication (TCI)domain indication information indicating the third antenna panel, and the first TCI domain indication information comprises at least one of a reference signal identifier corresponding to the third antenna panel, and a panel identifier of the third antenna panel.

13. The method of claim 12, wherein the first DCI signaling further comprises at least one of a panel identifier of the first antenna panel and a reference signal identifier corresponding to the first antenna panel.

14. The method of claim 12, wherein receiving the first DCI signaling sent by the base station comprises:
receiving the first DCI signaling on a first CORESET resource; and
determining the first antenna panel based on the first CORESET resource, and determining the first time-frequency resource, the third antenna panel, and the first beam direction based on the first DCI signaling.

15. The method of claim 10, wherein the preemption indication information comprises the second time-frequency resource and the second antenna panel;
receiving the preemption indication information sent by the base station comprising:
receiving a second DCI signaling sent by the base station, wherein the second DCI signaling comprises the preemption indication information; and
determining the second time-frequency resource and the second antenna panel based on the preemption indication information comprised in the second DCI signaling.

16. The method of claim 10, wherein the preemption indication information comprises the second time-frequency resource;
receiving the preemption indication information sent by the base station comprising:
receiving a third DCI signaling sent by the base station on a second CORESET resource, wherein the third DCI signaling comprises the preemption indication information;
determining the second antenna panel corresponding to the second CORESET resource based on predefined CORESET configuration information; and
determining the second time-frequency resource based on the preemption indication information comprised in the third DCI signaling.

17. The method of claim 16, wherein the predefined CORESET configuration information comprises a correspondence between a designated antenna panel and a designated CORESET resource, and the method further comprising:
receiving a radio resource control (RRC) signaling sent by the base station, wherein the RRC signaling comprises the predefined CORESET configuration information; and
obtaining the predefined CORESET configuration information from the RRC signaling.

18. The method of claim 10, determining, based on the preemption indication information, the overlapped resource between the first time-frequency resource and the second time-frequency resource and determining not to receive the downlink data on the overlapped resource, comprising:
determining whether the second antenna panel is the same as the first antenna panel;
determining whether the first time-frequency resource overlaps with the second time-frequency resource in response to determining that the second antenna panel is the same as the first antenna panel; and
determining the overlapped resource between the first time-frequency resource and the second time-frequency resource and determining not to receive the downlink data on the overlapped resource in response to determining that the first time-frequency resource overlaps with the second time-frequency resource.

19. A resource indication apparatus, applied to a terminal, comprising:
a processor;
a memory for storing processor executable instructions; wherein,
the processor is configured to:
receive preemption indication information sent by a base station, wherein the preemption indication information is configured to indicate a second time-frequency resource and generated by the base station in response to determining that a first antenna panel is the same as a second antenna panel and a first time-frequency resource overlaps with the second time-frequency resource; wherein the first antenna panel and the first time-frequency resource configured to send downlink data to the first terminal by the base station, and the second antenna panel and the second time-frequency resource configured to send downlink data to a second terminal by the base station; and
determine, based on the preemption indication information, an overlapped resource between the first time-frequency resource and the second time-frequency resource, and determine not to receive the downlink data on the overlapped resource.

* * * * *